SELF-ADJUSTING BRAKE MECHANISM

Filed Oct. 24, 1963

INVENTORS
Edward L. Nash
Vernon F. Fishtahler
BY D. D. McGraw
Their Attorney 3,223,203

SELF-ADJUSTING BRAKE MECHANISM

Edward L. Nash, Farmington, and Vernon F. Fishtahler, Lathrup Village, Mich., assignors to General Motors Corporation, Detroit, Mich., a corporation of Delaware Filed Oct. 24, 1963, Ser. No. 318,657
4 Claims. (Cl. 188—78)

This invention relates to a motor vehicle brake and more particularly to an anchoring means for retaining brake shoes in their operative alignment during violent brake actuations.

In a braking system for a motor vehicle in which the brake shoes are of the free floating variety, the braking action is brought about by pressure exerted by an hydraulic wheel cylinder on the brake shoes in conjunction with a movement of the brake shoes in the direction of wheel rotation. This movement of the brake shoes in the direction of wheel rotation is very slight and is in an arcuate path around the center of the wheel. The brake shoes normally have portions resting against an anchor pin which stops the rotary movement of the brake shoes at one end and causes a pivoting in an arcuate path of the brake shoes around this pin in the direction of the brake drum during brake actuation. During a so-called panic stop, very great force is exerted by the secondary shoe against this anchor pin as the brake shoes attempt to pivot on the pin. This force causes a slight deflection in the anchor pin in the direction of wheel rotation and destroys the perpendicular relationship between the brake shoe and the anchor pin that is normally established therebetween. This deflecting of the anchor pin causes a tendency for the secondary brake shoe to slide down the periphery of the pin and to be disengaged therefrom. It is old in the art to provide a separate flange secured to the pin to prevent the brake shoe from sliding off the pin. However, this type of flange requires an extra operation during assembly, has inherent cost, and causes other problems detrimental to an effective braking assembly.

It is an object of the present invention to provide a means integral to the anchor pin for preventing the brake shoe from sliding off the anchor pin during violent brake actuations.

It is another object of the present invention to provide a continuing perpendicular retaining means for the brake shoes during violent brake actuations as the anchor pin is deflected.

It is a further object of the present invention to provide an anchor pin for the brake shoes that is effective in retaining the brake shoes during violent brake actuations, that is inexpensive to manufacture and that provides no extra parts.

Further objects and advantages of the present invention will be apparent from the following description, reference being had to the accompanying drawings wherein a preferred embodiment of the present invention is clearly shown.

Figure 1:
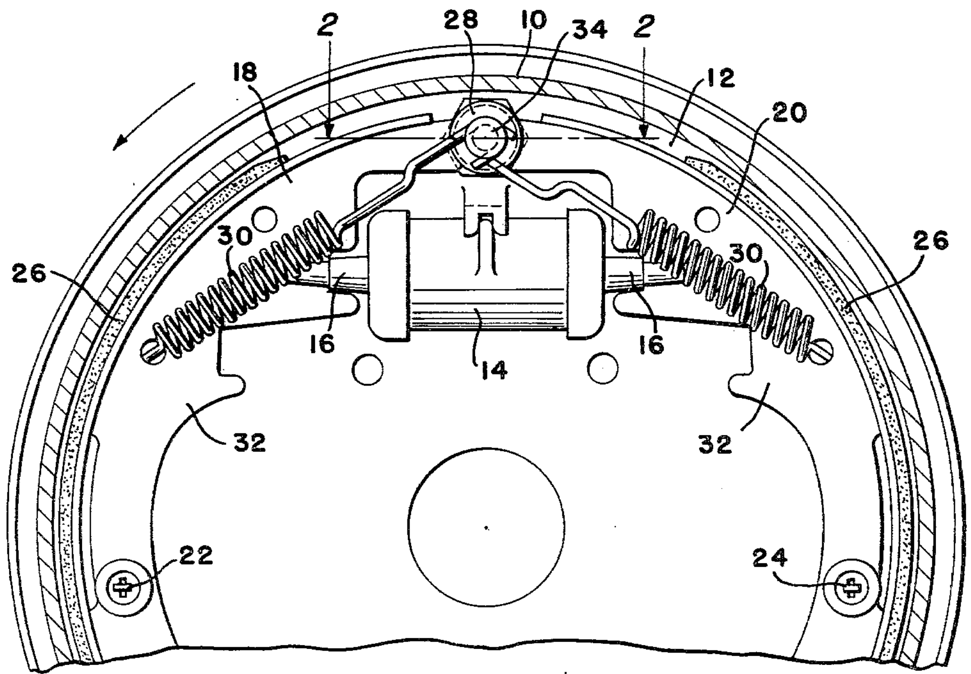
FIGURE 1 is a side elevation of the braking mechanism shown with parts broken away.

Referring now to FIGURE 1, a brake drum 10 provides a housing for the braking mechanism to be described. A backing plate 12 carries a hydraulic wheel cylinder 14 which has a pair of actuating plungers 16. The plungers 16 have slots, not shown, cooperating with a primary brake shoe 18 and a secondary brake shoe 20. The primary and secondary brake shoes are of the free floating variety; that is, they are not firmly affixed to any portion of the braking mechanism. The primary brake shoe 18 is loosely connected to the backing plate 12 by a biased connector 22 and the secondary brake shoe 20 is loosely connected to the backing plate 12 by a biased connector 24. The brake shoes have a lining material 26 disposed very near the inside surface of the brake drum 10 but far enough distant from the surface to allow the drum 10 to freely rotate therearound. An anchor pin 28 is firmly mounted on the backing plate 12. The shoe retractor springs 30 are attached on one end to a web 32 of the primary and secondary brake shoes and on the other end to a flanged pin 34 extending from the anchor pin 28.

Figure 2:
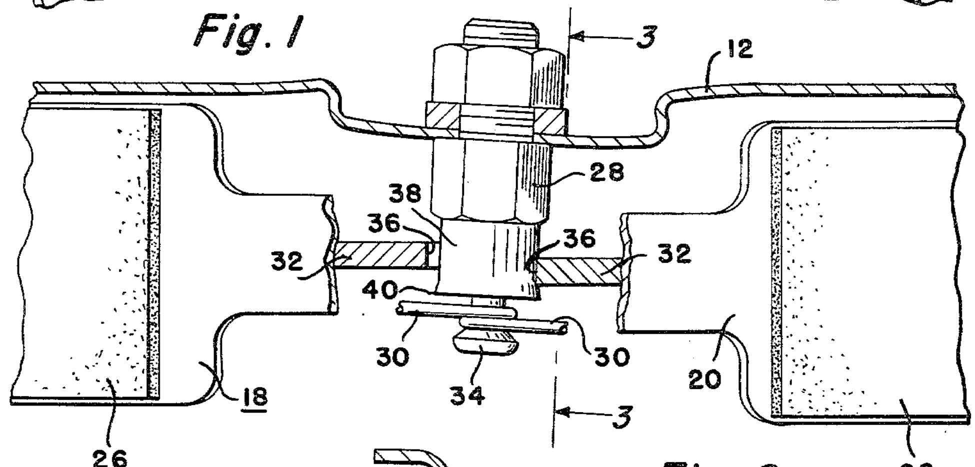
FIGURE 2 is a section taken along line 2—2 of FIGURE 1 illustrating the backing plate and the anchor pin in deflected relationship.

Referring now to FIGURE 2, the exact mounting of the anchor pin 28 to the backing plate 12 is illustrated. The webs 32 have arcuate portions 36 disposed to rest against a substantially cylindrical extension 38 of the anchor pin 28. The cylindrical extension 38 has an outturned peripheral flange 40 and is arranged to prevent the brake shoes from slipping off the anchor pin 28.

Figure 3:
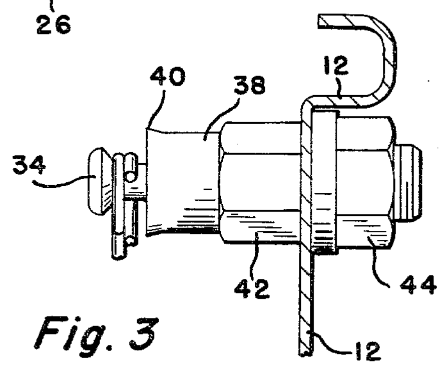
FIGURE 3 is a sectional view taken along line 3—3 of FIGURE 2 illustrating the configuration of the anchor pin.

Referring now to FIGURE 3, the out-turned flange or flared-out portion 40 is shown in side elevation and the flanged pin 34, protruding from the cylindrical extension 38, is illustrated engaging the ends of the springs 30. The nut portion 42 of pin 28 serves as a lock nut holding the anchor pin 38 in firm engagement to backing plate 12 by cooperating with a nut 44.

In operation, it will be assumed that a wheel and the brake drum 10 are rotating together in the direction of the arrow as illustrated in FIGURE 1. The braking action is begun by the forcing of hydraulic fluid in any well-known manner into the wheel cylinder 14. The wheel cylinder 14 is of common design and has opposed pistons, not shown, disposed to drive the plungers 16 in opposite directions in response to hydraulic pressure. This movement of the plunger 16 will cause an equal force to be exerted against the primary brake shoe 18 and the secondary brake shoe 20. As the primary brake shoe 18 makes initial contact with the inside surface of the brake drum 10, the primary brake shoe will be carried a slight distance in the direction of the arrow and will assume the position as illustrated in FIGURE 2. The arcuate portion 36 of the primary shoe web is shown as being withdrawn from its engagement with the cylindrical extension 38 of the anchor pin.

Referring to FIGURE 1, the movement of the primary brake shoe 18 in the direction of the arrow will result in the secondary brake shoe also moving in the direction of the arrow due to the engagement of the brake shoe in any well known manner. It should be noted that the springs 30 are continually urging the brake shoes in the direction of the anchor pin 28 against hydraulic pressure from the wheel cylinder 14. During normal forward braking operation of the brakes, the secondary brake shoe 20 will remain against the anchor pin 28. Any pressure from the wheel cylinder will cause the secondary brake shoe to pivot on the anchor pin 28 and move in an arcuate path towards the brake drum 10 resulting in a positive braking action against all braking surfaces of the lining 26.

However, under panic stop conditions, a slightly different situation occurs. If the hydraulic pressure build-up to the wheel cylinder 14 is very rapid, the brake shoes 18 and 20 are caused to move in the direction of wheel rotation very rapidly.

Referring now to FIGURE 2, the primary brake shoe 18, through its engagement with the rotating drum 10, will push the secondary brake shoe 20 against the anchor pin 28 with great force. FIGURE 2 illustrates an amount of deflection that is likely to occur with the anchor pin 28 and the backing plate 12 when the secondary brake shoe 20 makes contact with the cylindrical extension 38. It is apparent that the relationship between the web 32 and the cylindrical extension 38, which is normally perpendicular, has now become nonperpendicular. It is also seen that the web 32 of the secondary brake shoe 20 would have a tendency to slide along the cylindrical extension 38 in the direction of the flanged pin 34. The peripheral flange or flared-out portion 40, due to its curvature, tends to continue to provide a substantially perpendicular face against the arcuate portion 36 of the secondary brake shoe 20 during the movement along the axis of the anchor pin 28 of the secondary brake shoe. Therefore, the web 32 of the secondary brake shoe 20 tends to be retained on the cylindrical extension 38 of the anchor pin 28 during violent actuation of the brakes as would be experienced in a panic stop situation. When the braking forces are lessened and pin 28 is permitted to again assume a more perpendicular relationship, the slope of the flange 40 urges the shoe web 32 to return to its central position, thus keeping the shoe in proper relationship to the anchor pin, backing plate and drum.

The utility of the present invention becomes obvious in light of the fact that, were the secondary brake shoe 20 to slide off the cylindrical extension 38 of the anchor pin 28, the braking action in that particular wheel would disappear and internal parts would be severely damaged and rendered permanently ineffective. This would result in an extremely hazardous situation with the wheel on the opposite side of the vehicle might continue to brake and draw the vehicle in the direction of that wheel or cause the loss of braking action due to the principles of hydraulics. This invention is meant to obviate that possibility.

Another feature of the present invention that is particularly advantageous is the lack of necessity for installing a separate retaining means on the anchor pin and thereby increasing cost of the braking mechanism as well as making the assembly thereof more involved.

While the embodiment of the present invention, as herein disclosed, constitutes a preferred form, it is to be understood that other forms might be adopted.

What is claimed is as follows:

1. A brake assembly comprising; a brake drum, a backing plate normally rigid but deflectable during violent brake actuation, a plurality of brake shoes mounted on said backing plate in proximate relationship to an inside periphery of said brake drum and adapted to move into firmer engagement with the brake drum by a servo action during actuation thereof, brake shoe anchoring means mounted on said backing plate perpendicular to the operative surfaces of said brake shoes, and shoe retraction means arranged to urge said brake shoes towards said anchoring means, said anchoring means having integral portions adapted to retain said brake shoes in lateral engagement with said anchoring means as the anchoring means is deflected by the servo action of the brake shoes during actuation thereof.

2. In a brake assembly having a primary brake shoe and a secondary brake shoe, an anchoring means comprising; a backing plate normally rigid but deflectable during violent brake actuation and an anchor pin carried by said backing plate, said primary and secondary brake shoes having arcuately shaped end portions arranged to cooperate with said anchor pin, said shoes adapted to create a servo action during engagement with a brake drum, said anchor pin having a flared-out end portion adapted to retain said arcuately shaped end portion of said primary and secondary brake shoes as the anchor pin is deflected by the servo action of the brake shoes during a violent actuation thereof.

3. In a brake assembly having a primary shoe and a secondary shoe, anchoring means comprising; a deflectable backing plate and an anchor pin including holding means on either side of said backing plate for holding said anchor pin and said backing plate in firm engagement, the primary shoe and the secondary shoe having arcuately shaped grooves formed in one end thereof, said grooves arranged to rest against opposite peripheral portions of said anchor pin, said anchor pin having a flared-out portion for retaining said secondary brake shoe, said anchor pin being slightly deflected with said backing plate during severe pressure brake actuation as the primary shoe forces the secondary shoe against the peripheral portion of said anchor pin, said flared portion providing a substantially flat anchor for the secondary shoe as it moves outwardly along the deflected anchor pin.

4. In a brake assembly having a free floating primary shoe and secondary shoe, anchoring means comprising; a backing plate being in biased engagement with the primary shoe and the secondary shoe, and an anchor pin secured to said backing plate and having a cylindrical portion in perpendicular extension therefrom, the primary shoe and the secondary shoe having arcuately shaped end portions arranged to biasedly engage the periphery of said cylindrical perpendicular extension of said anchor pin at substantially right angles thereto, said secondary shoe causing a slight deflection of said backing plate and said anchor pin during a violent brake actuation due to the servo action of the primary shoe on the secondary shoe, said slight deflection changing the perpendicular relationship of said anchor pin to the secondary brake shoe and thereby creating a tendency for said secondary shoe to slide along the cylindrical extension, said cylindrical extension having an out-turned lip portion disposed to provide a lateral resistance to the sliding secondary brake shoe at various points along said cylindrical extension.

References Cited by the Examiner

UNITED STATES PATENTS

| | | | |
|---|---|---|---|
| 2,114,672 | 4/1938 | Bertrand | 188—78 |
| 2,842,229 | 7/1958 | Ross | 188—78 |

FERGUS S. MIDDLETON, *Primary Examiner.*

RALPH D. BLAKESLEE, ARTHUR L. LA POINT, *Examiners.*